Fig. 1

March 9, 1965  W. A. TAYLOR  3,172,394
RESTRAINING DEVICES
Filed April 29, 1963  5 Sheets-Sheet 2

March 9, 1965 W. A. TAYLOR 3,172,394
RESTRAINING DEVICES

Filed April 29, 1963 5 Sheets-Sheet 3

United States Patent Office 3,172,394
Patented Mar. 9, 1965

3,172,394
RESTRAINING DEVICES
William A. Taylor, St. Louis County, Mo.
(8914 Francis Court, Affton 23, Mo.)
Filed Apr. 29, 1963, Ser. No. 276,440
10 Claims. (Cl. 119—107)

This invention relates to improvements in restraining devices for animals. More particularly, this invention relates to improvements in restraining devices which can be used to confine pets, such as dogs.

It is, therefore, an object of the present invention to provide an improved restraining device which can be used to confine pets, such as dogs.

It would be desirable to provide a confining device which could confine pets, such as dogs, adjacent to and within a predetermined area, which would be inexpensive, which would not appreciably interfere with mowing, rolling or aerating of the said area, and which would not permit the pets to become entangled with tree trunks, bushes, shrubs, lawn furniture, and the like. The present invention provides such a confining device; and it is, therefore, an object of the present invention to provide a device which can confine pets, such as dogs, adjacent to and within a predetermined area, which is inexpensive, which will not appreciably interfere with mowing, rolling or aerating of the said area, and which will not permit the pets to become entangled with tree trunks, bushes, shrubs, lawn furniture, and the like.

The confining device provided by the present invention has a number of elongated members that coact to define an area adjacent to, and within which, the pets can be confined. Each of those elongated members has a number of slots which have open ends confronting the said area; and those slots are relatively narrow. Those slots are wide enough to freely accommodate the cross section of a strap, a rope, a chain or other tether which can be secured to the pet's collar; but those slots are narrow enough to block the passage through them of abutments which are secured to that strap, rope, chain, or other tether. If the pet attempts to leave the said area, the cross section of the strap, rope, chain, or other tether will find its way into one of the slots of one of the elongated members; and as the abutment on that tether reaches that slot, the slot-defining portions of that elongated member will intercept and hold that abutment. As a result, while the pet is able to move freely within the said area, he cannot leave that area. When the pet realizes that he cannot leave that area, he will re-enter that area; and, as he does so, the cross section of the strap, rope, chain, or other tether will easily pull out of the slot and permit the pet to again move freely within the said area. It is, therefore, an object of the present invention to provide a number of elongated members that coact to define an area and that have a number of slots which have open ends confronting the said area and which will freely accommodate the cross section of a strap, rope, chain, or other tether but which will block the passage through them of an abutment on that tether.

The restraining device of the present invention is preferably made so the elongated members thereof are releasably secured to low supports that are set in the ground. Whenever the area, bounded by those members, is to be mowed, rolled, or aerated, those members can be separated from those supports; and, at such time, the said area can be freely mowed, rolled or aerated. It is, therefore, an object of the present invention to provide a confining device wherein elongated members are releasably secured to supports that are set in the ground.

In one preferred embodiment of the present invention, the slots of the elongated members are defined by a number of U-shaped elements which incline upwardly and inwardly toward the area defined by those members. The rounded ends of those U-shaped elements keep children and pets from injuring themselves even if they run directly into the elongated members of the restraining device. Also, those U-shaped elements help guide the cross section of the strap, rope, chain, or other tether into the slots between those elements. It is, therefore, an object of the present invention to utilize U-shaped elements to define the slots of the elongated members of a pet-restraining device, and to incline those elements upwardly and inwardly of those members.

Other and further objects and advantages of the present invention should become apparent from an examination of the drawing and accompanying description.

In the drawing and accompanying description, a preferred embodiment of the present invention is shown and described but it is to be understood that the drawing and accompanying description are for the purpose of illustration only and do not limit the invention and that the invention will be defined by the appended claims.

Figure 1:
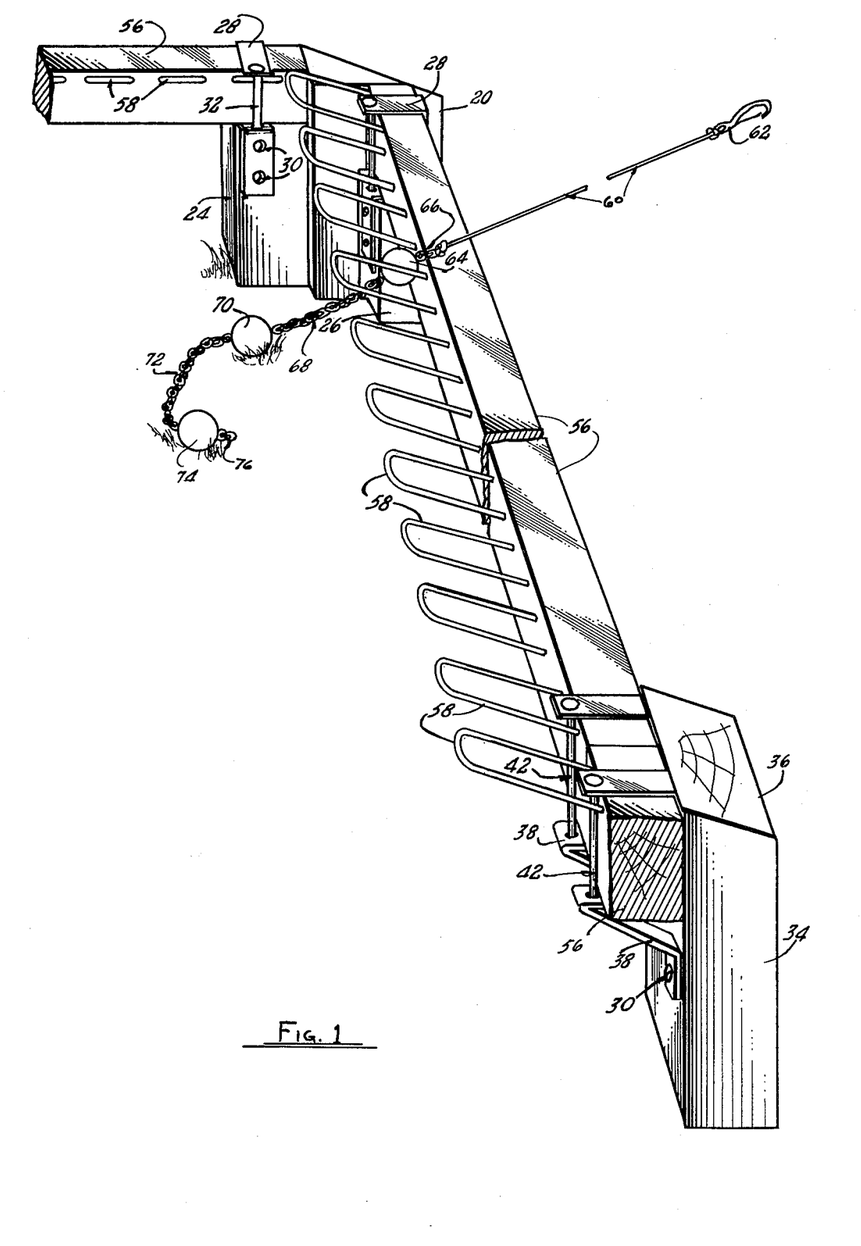
FIG. 1 is a broken, perspective view of a portion of a restraining device for pets, such as dogs.
Figure 2:
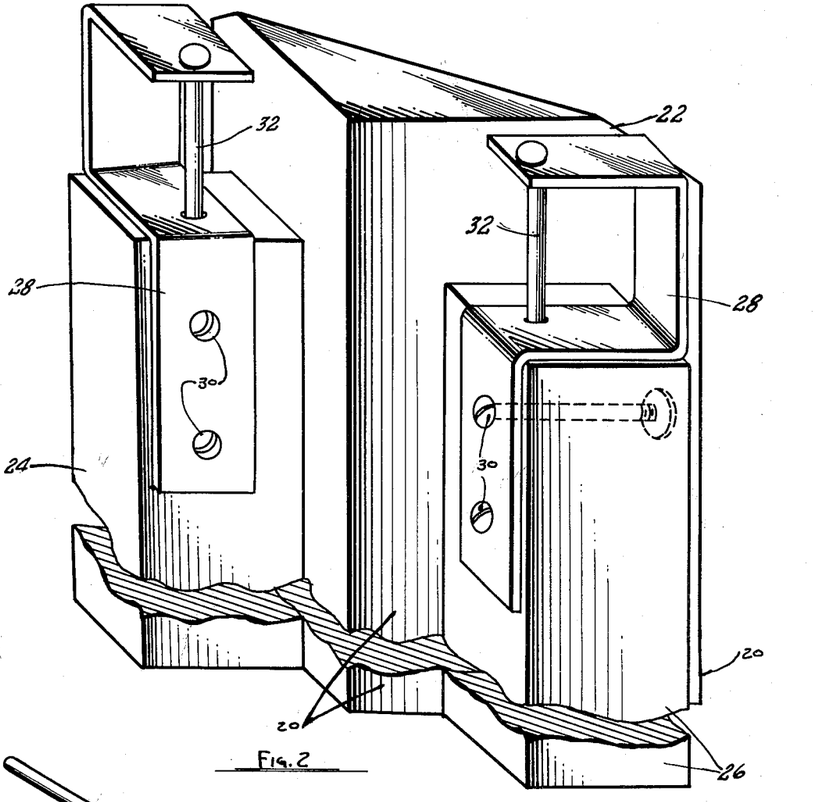
FIG. 2 is a broken, perspective view, on a larger scale, of the corner post shown in FIG. 1.

Referring to the drawing in detail, the numeral 20 denotes a corner post which can be used in the restraining device provided by the present invention. That corner post can be a "four by four" post; and, that corner post can be set in the ground so just a portion thereof projects above the surface of the ground. Usually, the top of that post will be spaced about four to eight inches above the surface of the ground. The outer portion of the top of that post is chamfered, as indicated by the numeral 22. A small block 24, which can be a length of "two by two," is suitably bolted, nailed or glued to one face of the post 20. A similar block 26 is bolted, nailed or glued to an adjacent face of the post 20. As indicated particularly by FIG. 2, the tops of the blocks 24 and 26 are disposed below the level of the top of the post 20.

The numeral 28 denotes a bracket which has a vertically-directed lower portion and which has an upper portion that is bent to define a generally C-shaped recess. The vertically-directed portion of the bracket 28 will be set in abutting relation to the inner face of the block 24 or to the inner face of the block 26, as shown particularly by FIG. 2. The upper portion of the bracket 28, which defines the C-shaped recess, will overlie and will abut the top of the block 24 or the top of the block 26. Bolts 30 extend through openings in the vertically-directed lower portion of the bracket 28 and through corresponding openings in the blocks 24 and 26. Washers are telescoped onto the projecting shanks of the bolts 30, and nuts are threaded onto those projecting shanks to fixedly secure the brackets 28 to the blocks 24 and 26. The bracket 28 has vertically-directed openings in the upper portion thereof, adjacent the open side of the C-shaped recess; and those openings accommodate a retainer 32. While different forms of retainers could be used, a blunt nail is very useful.

Where the pet is to be confined adjacent to and within a generally rectangular area, four corner posts 20 will be used. A corner post 20 will be set in the ground at each corner of that area; and the chamfered outer portions 22 of the tops of those posts will face outwardly and away from that area.

If the area adjacent to and within which the pet is to be confined is quite small, only corner posts 20 will be needed; but frequently that area will be large enough to require line posts. One such line post is shown in detail in FIGS. 7 and 8; and that post can be a "two by four." The line posts will have the lower portions thereof set within the ground, and will have the upper portions thereof extending above the surface of the ground. Usually, the tops of the line posts will be spaced about four to eight inches above the surface of the ground. The line posts are denoted by the numeral 34; and the tops 36 thereof incline outwardly and downwardly relative to the area defined by the restraining device of the present invention.

Figure 7:
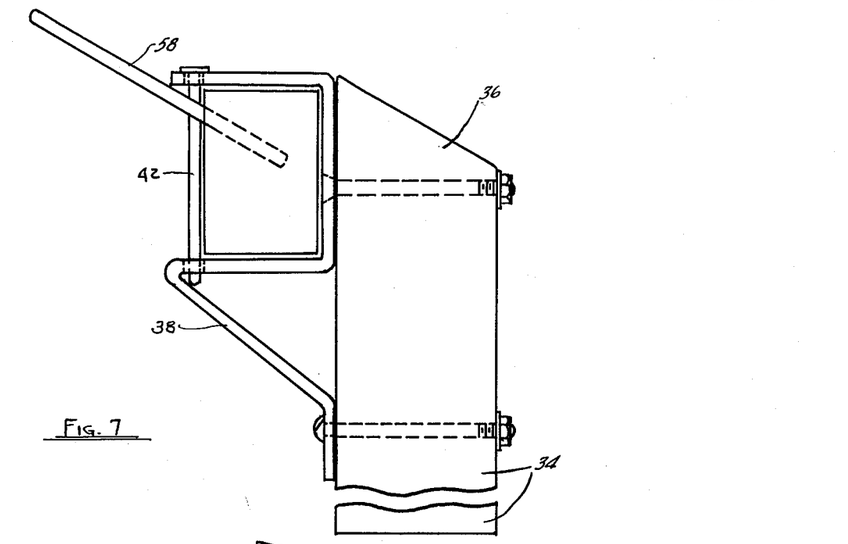
FIG. 7 is a broken, end view, on the scale of FIG. 2, of one of the elongated members used in the restraining device of FIG. 1, and it shows one of the line posts used in that restraining device.
Figure 8:
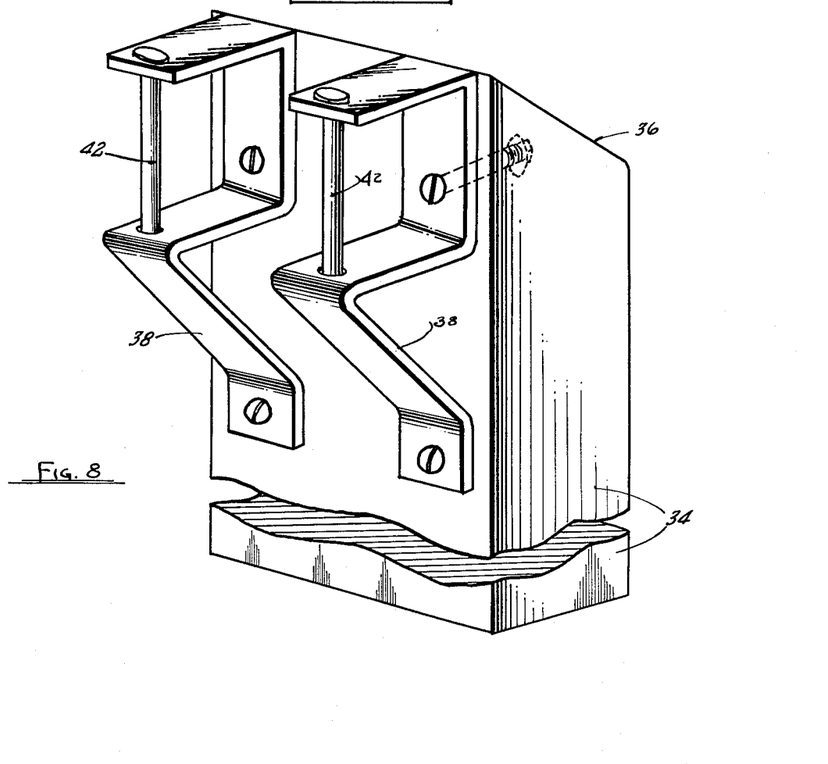
FIG. 8 is a broken, perspective view, on the scale of FIG. 2, of the line post shown in FIG. 7.

The numeral 38 denotes a bracket which has a horizontally-directed opening in the lower portion thereof, which has a bent portion that extends upwardly and inwardly from that lower portion, and which has an upper portion that defines a C-shaped recess. A horizonally-directed opening is provided in the upper portion of the bracket 38; and bolts 40 extend through that opening and through the opening in the lower portion of that bracket to secure that bracket to the post 34. Washers are telescoped over the projecting shanks of those bolts; and nuts are threaded onto those projecting shanks to prevent accidental separation of the bracket 38 from the post 34. Vertically-directed openings are provided in the upper portion of the bracket 38 adjacent the open side of the C-shaped recess; and those openings can accommodate a retainer 42. While different forms of retainers could be used, a blunt nail is very useful.

Figure 6:
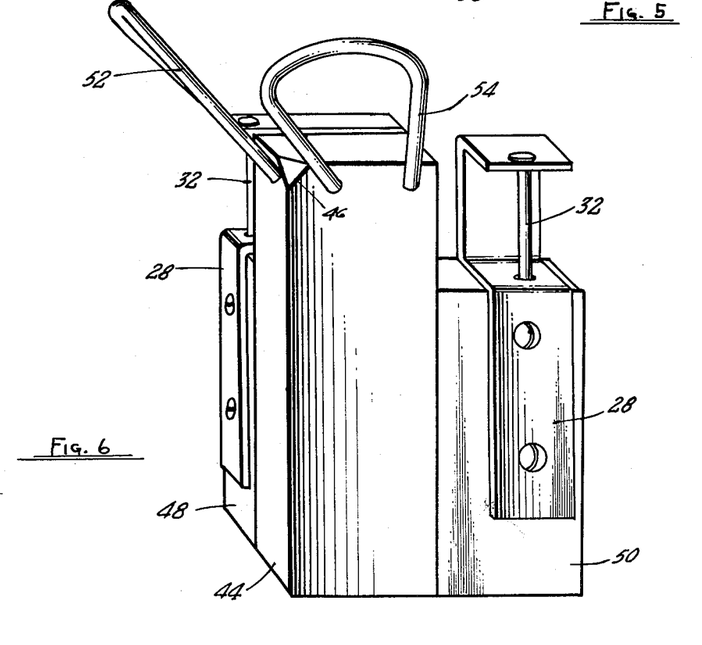
FIG. 6 is a perspective view, on the scale of FIG. 2, of an inside corner post that can be used with the restraining device of the present invention.

As indicated particularly by FIG. 8, two brackets 38 are secured to the inner face of each line post 34. The upper surfaces of the brackets 38 are set flush with the upper edge of the inclined top 36 of the line post to which those brackets are secured. As a result, there will be no change of surface between the tops of those brackets and the tops of those posts, which could obstruct the free movement of a strap, rope, chain, or other tether.

Where the area adjacent to and within which the pet is to be restricted has a corner with an angle of about two hundred and seventy degrees, a corner post such as the corner post 44 in FIG. 6 should be used. That corner post can be a "two by two"; and the outer corner of the top thereof will be chamfered, as indicated by the numeral 46. The lower portion of the post 44 will be set in the ground, and the upper portion of that post will usually be spaced above the surface of the ground about four to eight inches. A block 48, which can be a "two by two," is secured to one face of the corner post 44; and a similar block 50 is secured to an adjacent face of that post. The block 48 has a bracket 28 secured to the inner face thereof by bolts 30; and the block 50 has a bracket 28 secured to the inner face thereof by bolts 30. The inner faces of the blocks 48 and 50 and the inner faces of the corner post 44 will coact to subtend an angle of about two hundred and seventy degrees.

Figure 4:
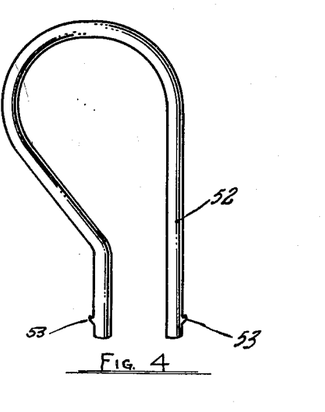
FIG. 4 is a plan view, on the scale of FIG. 2, of one form of generally U-shaped element that can be used with the restraining device of the present invention.

The post 44 has shallow sockets formed therein adjacent the upper edges of the inner faces thereof; and those sockets incline downwardly and inwardly of that post. Those sockets are paired; and the sockets of each pair of sockets are parallel to each other. Two of the sockets accommodate the arms of a loop 52, and the other two sockets accommodate the arms of a loop 54. The configuration of the loop 52 is indicated in detail by FIG. 4; and the loop 54 is a mirror image of the loop 52. It will be noted that the arms of the loop 52 have small spurs 53 thereon. Those spurs will not materially impede the insertion of the ends of the arms of the loops 52 and 54 into the sockets within the post 44; but those spurs will prevent accidental separation of those loops from that post.

Figure 3:
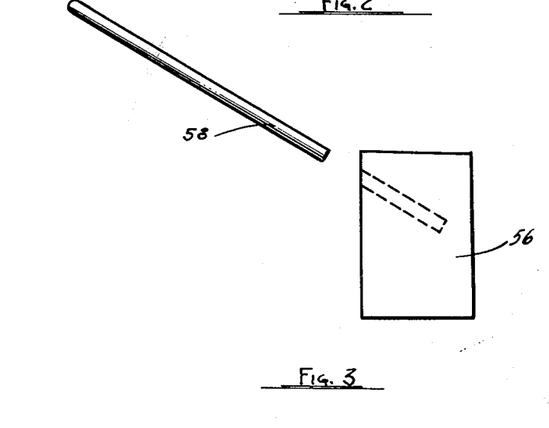
FIG. 3 is an exploded end view, on the scale of FIG. 2, of one of the elongated members used in the restraining device of FIG. 1.
Figure 5:
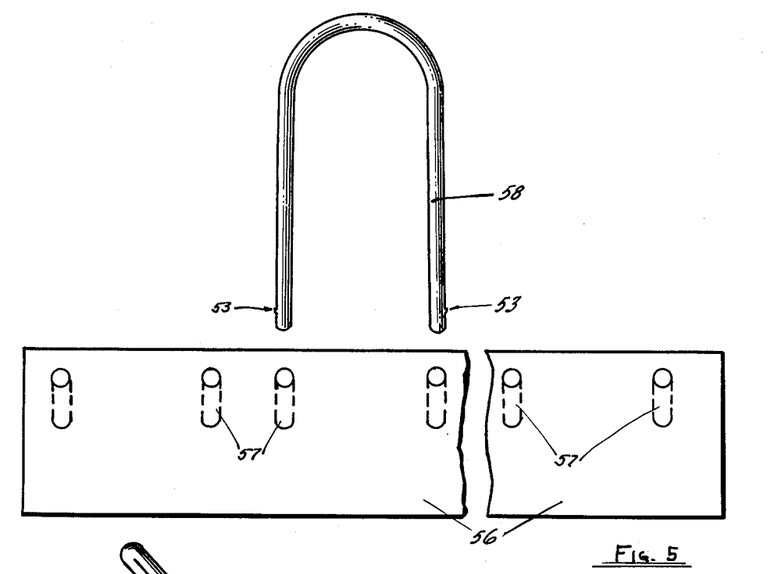
FIG. 5 is a broken, exploded, elevational view, on the scale of FIG. 2, of one of the elongated members and one of the U-shaped elements used in the restraining device of FIG. 1.

The numeral 56 denotes elongated bars; and those bars can be "one and three-quarters by one and one-quarter." Each of those bars has a number of pairs of short sockets which incline downwardly and inwardly from those portions of the inner faces of those bars that are adjacent the upper edges of those bars. Those sockets accommodate the arms of U-shaped loops 58. Preferably, the arms of the loops 58 will have spurs 53 thereon; and those spurs will not materially impede the insertion of the arms of the loops 58 into those sockets but will resist accidental separation of those loops from the bars 56. When the various loops 58 are assembled with the bars 56, the adjacent arms of those loops define a series of slots that are directed transversely of the elongated axes of the bars 56. The bars 56 are dimensioned so they fit easily within the C-shaped recesses defined by the upper portions of the brackets 28 and 38. To assemble the bars 56 with the posts 20, 34 and 44, it is only necessary to remove the retaining pins 32 and 42 and to set the bars within the C-shaped recesses defined by the upper portions of the brackets 28 and 38. Once those bars have been set within those recesses, the retaining pins 32 and 42 can be replaced; and thereafter those retaining pins will keep those bars from moving transversely of the elongated axes of those bars. The posts 20 will keep those bars 56 which are adjacent those posts from shifting axially beyond those posts, and the confronting ends of adjacent bars 56 will keep the bars 56 from shifting axially away from those posts. As a result, the bars 56 will be held against accidental separation from the posts 20, 34 and 44. The bars 56 will set so the loops 58 extend upwardly and inwardly from the upper and inner surfaces of those bars.

Figure 9:
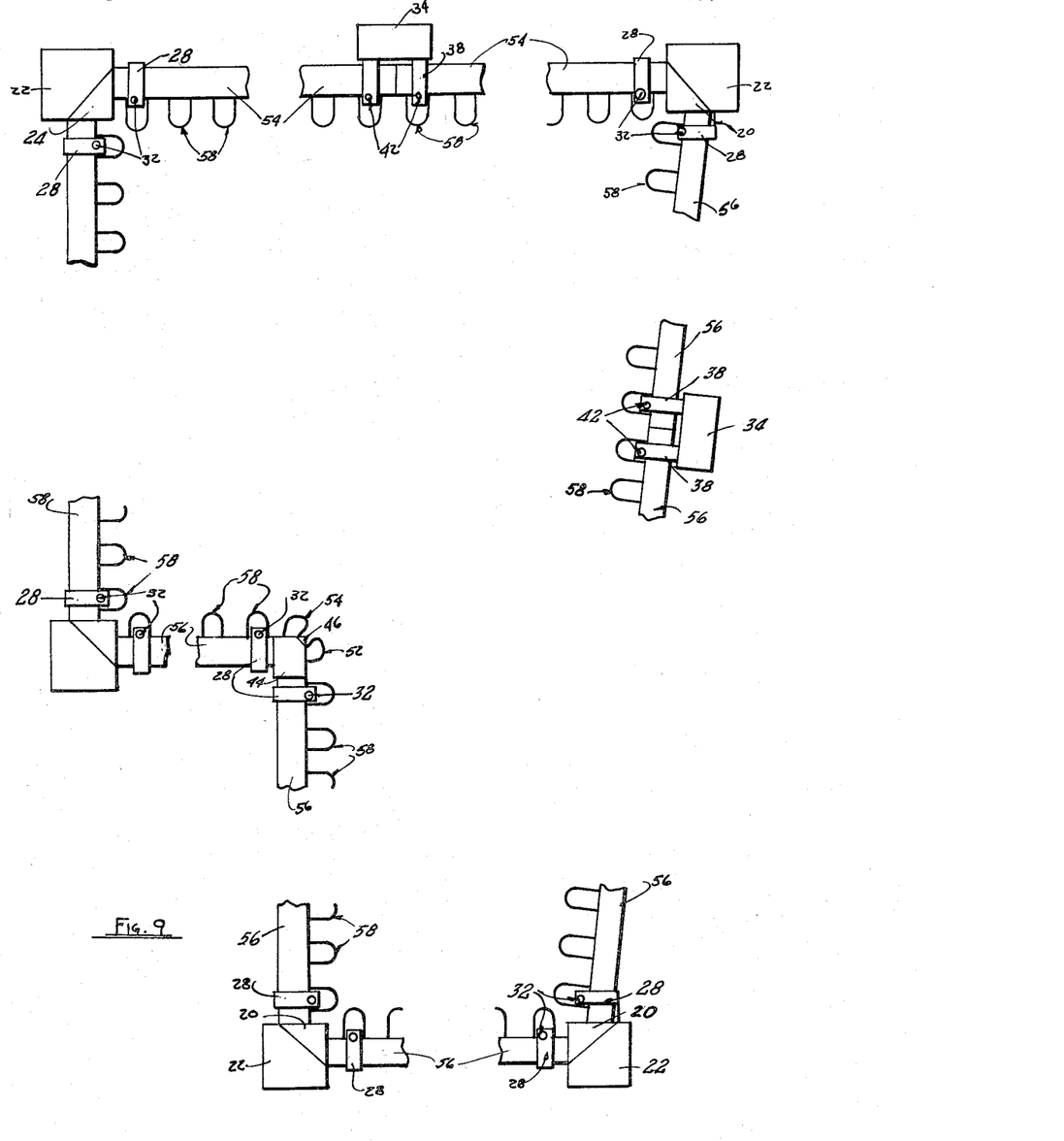
FIG. 9 is a broken plan view, on a small scale, of a restraining device which defines an irregular area.

If the sides of the area, within which and adjacent to which the pet is to be restrained, do not constitute integral multiples of the length of a bar 50, one more of the bars can be suitably cut to length. If that area does not have corners of exactly ninety degrees, the bars 56 can be set at angles relative to the corner posts 20, as indicated particularly by FIG. 9.

The restraining device provided by the present invention is inexpensive, and it is readily installed. All that need be done is to set the posts 20 and 34, and to set the posts 44 if such posts are used, in the ground with the upper ends of those posts about four to eight inches above the surface of the ground. Thereafter, the retaining pins 32 and 42 are removed, the bars 56 are set within the C-shaped recesses defined by the upper portions of the brackets 28 and 38, and then the pins 32 and 42 are replaced. The bars 56 are so close to the ground that even small children can readily step over them. Also, those bars are so close to the ground that pets can not crawl under them. Where very small pets are to be confined, the posts 20, 34 and 44 can be set even deeper in the ground so the spaces between the bottom faces of the bars 56 and the surface of the ground will be too small to accommodate those pets.

If it is desirable to mow, roll or aerate the area, it is only necessary to lift the retaining pins 32 and 42 and to move the bars 56 out of the path of the mower, roller or aerator. Once the area has been mowed, rolled or aerated, the bars 56 and the retaining pins 32 and 42 can be replaced. As a result, the restraining device provided by the present invention can be used to restrain pets but can also permit mowing, rolling and aerating of the area.

A short tether 60, which can be a strap, a rope, a chain, or the like, will be secured to the collar, shoulder harness, leg cuff, or the like of the animal by a snap 62. An abutment 64, which is shown in the form of a ball of aluminum, wood, or other weatherproof, non-toxic material, has an eye 66 therein; and the tether 60 will be suitably secured to that eye. A short length 68 of strap, rope, chain, or the like extends from a second eye in the abutment 64 to an eye in an abutment 70. A second short length 72 of strap, rope, chain, or the like extends from a second eye in the abutment 70 to an eye in an abutment 74. An additional short length 76 of strap, rope, chain, or the like is connected to a second eye in the abutment 74. The overall length of abutment 64, length 68, abutment 70, length 72, abutment 74, and length 76 can be quite short—being well less than two feet. Chains are preferred for the lengths 68, 72 and 76, because the weights of chains will keep the abutments from bouncing over the bars 56 as the pet runs toward and over those bars.

The diameters of the abutments 64, 70 and 74 can be small; and, in one preferred embodiment of the present invention, those diameters are one inch. The spaces between adjacent loops 52, 54 and 58 are about three-quarters of an inch; and hence those spaces will freely accommodate the tether 60 and the lengths 68 and 72 but the loops will block the passage therebetween of any of the abutments 64, 70 and 74.

The tether 60, the abutments 64, 70 and 74, and the lengths 68, 72 and 76 do not constitute a burden on even a very small pet; and hence a pet can romp freely within the area defined by the restraining device of the present invention. However, if the pet steps or jumps over a bar 56—and all of the bars 56 are set close enough to the ground to keep the pet from crawling underneath them—the tether 60 will find its way into one of the slots defined by the loops 52, 54 and 58. That tether will move freely through that slot, but the abutment 64 will be unable to pass through that slot; and, as that abutment reaches the loops 52, 54 or 58 which define that slot, that abutment will halt further movement of the pet outwardly of and away from the said area. When the pet realizes that further movement outwardly and away from the said area is not possible, and moves back across the bar 56, the tether 60 will move freely back into the area and will pull itself out of the slot between the said loops. The inclined tops 36 of the line posts 34, the chamfered portions 22 of the posts 20, and the inclined portions 46 of the tops of the posts 44 will act as inclined planes and guide the tether 60 upwardly over those posts, in the event the movement of the pet causes the tether 60 to come into proximity to those posts. As a result, the tether 60 will not become entangled or snagged. The small sizes of the abutments 64, 70 and 74, and the fact that those abutments and the lengths 68, 72 and 76 freely trail the pet, keep the pet from becoming entangled with tree trunks, bushes, shrubs, lawn furniture, and the like.

While ordinarily the abutment 64 will engage the loops which define the slot which the tether 60 enters, a pet might be running so fast that the abutment 64 might bounce upwardly above the levels of the loops 52, 54 and 58 and not be intercepted. In such event, the abutment 70 or the abutment 74 would engage the loops 52, 54 or 58 and restrain further outward movement of the pet.

The sizes stated herein for the posts 20, 34 and 44, for the bars 56, for the abutments 64, 70 and 74, and the lengths 68, 72 and 76 are merely representative. Where very large pets are to be restrained, those sizes could be increased; and where very small pets are to be restrained, those sizes could be decreased.

While the restraining device provided by the present invention is particularly useful with pets, such as dogs, it is useful with other animals and with non-flying birds. Suitable harnesses, cuffs or the like can be provided for the animals or birds, and the snap 62 will be suitably secured to those harnesses, cuffs or the like.

Where the animal or bird to be restrained is quite active and is quick in its movements, three abutments are desirable. With less active or slower-moving animals or birds, two abutments or even one abutment should suffice.

The restraining device provided by the present invention can be used to confine and restrain more than one animal or bird at a time. All that is required is that each animal or bird have its own tether 60, abutments 64, 70 and 74, and lengths 68, 72 and 76.

Whereas the drawing and accompanying description have shown and described a preferred embodiment of the present invention it should be apparent to those skilled in the art that various changes may be made in the form of the invention without affecting the scope thereof.

What I claim is:

1. A restraining device for pets, such as dogs, which comprises:
   (a) a plurality of posts that are adapted to have the lower portions thereof set in the ground and to have the upper portions thereof disposed above the surface of the ground,
   (b) brackets that are supported by said posts and that define C-shaped recesses adjacent the upper ends thereof,
   (c) retaining elements that are releasably securable to said brackets to close said C-shaped recesses,
   (d) elongated bars that are dimensioned to fit within and to be releasably held within said C-shaped recesses defined by said brackets,
   (e) said elongated bars being releasably held within said C-shaped recesses in said brackets by said retaining elements,
   (f) a plurality of loops that are secured to said bars and that incline upwardly and inwardly of said bars,
   (g) said loops being spaced apart to define a plurality of parallel slots which extend inwardly from the inner faces of said bars,
   (h) said loops having rounded closed ends,
   (i) a tether that can be secured to the collar of a pet,
   (j) said tether being dimensioned to fit loosely within said slots,
   (k) an abutment that is secured to said tether and that is dimensioned so it can not pass through said slots,
   (l) a length of tether intermediate the first said abutment and a second abutment,
   (m) said second abutment being dimensioned so it can not pass through said slots,
   (n) a second length of tether intermediate said second abutment and a third abutment,
   (o) said third abutment being dimensioned so it can not pass through said slots,
   (p) a final length of tether that extends from said third abutment,
   (q) said posts and said bars being adapted to coact to define a closed area,
   (r) said abutments being formed from a weather-resistant, non-toxic material,
   (s) said tether, said abutments, and said lengths of tether being adapted to trail along freely as said pet moves about within said area,
   (t) said tether being adapted to freely enter one of said slots whenever said pet attempts to move away from said area,
   (u) one of said abutments being adapted to engage the loops which define said one slot and thereby halt further movement of said pet away from said area,
   (v) said posts having inclined upper surfaces that minimize the possibility of said tether becoming entangled or snagged on said posts,

7

(w) said loops freely releasing said tether and said abutments as said pet moves back into said area,
(x) said bars being adapted to be set with their lower faces close enough to the surface of the ground to keep said pet from crawling between said bars and said surface of said ground,
(y) said retaining elements being separable from said brackets to enable said bars to be separated from said brackets and posts to permit mowing, rolling, or aerating of said area,
(z) said retaining elements being blunt nails,
(aa) said loops being secured to said bars by having the arms thereof telescoped into sockets in said bars,
(ab) said arms of said loops having spurs thereon that resist accidental withdrawal of said arms from said sockets,
(ac) said lengths of tether being chains,
(ad) said posts limiting axial shifting of said bars.

2. A restraining device for animals which comprises:
(a) a plurality of posts that are adapted to have the lower portions thereof set in the ground and to have the upper portions thereof disposed above the surface of the ground,
(b) brackets that are supported by said posts and that define C-shaped recesses adjacent the upper ends thereof,
(c) retaining elements that are releasably securable to said brackets to close said C-shaped recesses,
(d) elongated bars that are dimensioned to fit within and to be releasably held within said C-shaped recesses defined by said brackets,
(e) said elongated bars being releasably held within said C-shaped recesses in said brackets by said retaining elements,
(f) a plurality of loops that are secured to said bars and that incline upwardly and inwardly of said bars,
(g) said loops being spaced apart to define a plurality of slots which extend inwardly from said bars,
(h) said loops having rounded closed ends,
(i) a tether that can be secured to the collar of an animal,
(j) said tether being dimensioned to fit loosely within said slots,
(k) an abutment that is secured to said tether and that is dimensioned so it can not pass through said slots,
(l) a length of tether intermediate the first said abutment and a second abutment,
(m) said second abutment being dimensioned so it can not pass through said slots,
(n) a second length of tether intermediate said second abutment and a third abutment,
(o) said third abutment being dimensioned so it can not pass through said slots,
(p) said posts and said bars being adapted to coact to define a closed area,
(q) said abutments being formed from a weather-resistant, non-toxic material,
(r) said tether, said abutments, and said lengths of tether being adapted to trail along freely as said animal moves about within said area,
(s) said tether being adapted to freely enter one of said slots whenever said animal attempts to move away from said area,
(t) one of said abutments being adapted to engage the loops which define said one slot and thereby halt further movement of said animal away from said area,
(u) said loops freely releasing said tether and said abutments as said animal moves back into said area,
(v) said bars being adapted to be set with the lower faces thereof close enough to the surface of the ground to keep said animal from crawling between said bars and said surface of said ground,

8

(w) said retaining elements being separable from said brackets to enable said bars to be separated from said brackets and said posts to permit mowing, rolling, or aerating of said area,
(x) said lengths of tether being chains.

3. A restraining device for animals which comprises:
(a) a plurality of posts that are adapted to have the lower portions thereof set in the ground and to have the upper portions thereof disposed above the surface of the ground,
(b) brackets that are supported by said posts,
(c) elongated bars that are securable to said brackets and hence to said posts,
(d) a plurality of loops that are secured to said bars and that incline upwardly and inwardly of said bars,
(e) said loops being spaced apart to define a plurality of slots which extend inwardly from said bars,
(f) a tether that can be secured to the collar of an animal,
(g) said tether being dimensioned to fit loosely within said slots,
(h) an abutment that is secured to said tether and that is dimensioned so it can not pass through said slots,
(i) a length of tether intermediate the first said abutment and a second abutment,
(j) said second abutment being dimensioned so it can not pass through said slots,
(k) said posts and said bars being adapted to coact to define a closed area,
(l) said abutments being formed from a weather-resistant, non-toxic material,
(m) said tether, said abutment, and said length of tether being adapted to trail along freely as said animal moves about within said area,
(n) said tether being adapted to freely enter one of said slots whenever said animal attempts to move away from said area,
(o) one of said abutments being adapted to engage the loops which define said one slot and thereby halt further movement of said animal away from said area,
(p) said loops freely releasing said tether and said abutments as said animal moves back into said area,
(q) said bars being adapted to be set with the lower faces thereof close enough to the surface of the ground to keep said animal from crawling between said bars and said surface of said ground,
(r) said bars being selectively separable from said brackets and hence from said posts.

4. A restraining device for animals which comprises:
(a) a plurality of posts that are adapted to have the lower portions thereof set in the ground and to have the upper portions thereof disposed above the surface of the ground,
(b) brackets that are supported by said posts,
(c) elongated bars that are securable to said brackets and hence to said posts,
(d) a plurality of loops that are secured to said bars and that incline upwardly and inwardly of said bars,
(e) said loops being spaced apart to define a plurality of slots which extend inwardly from said bars,
(f) a tether that can be secured to the collar of an animal,
(g) said tether being dimensioned to fit loosely within said slots,
(h) an abutment that is secured to said tether and that is dimensioned so it can not pass through said slots,
(i) said posts and said bars being adapted to coact to define a closed area,
(j) said tether and said abutment being adapted to trail along freely as said animal moves about within said area,
(k) said tether being adapted to freely enter one of said slots whenever said animal attempts to move away from said area, (*l*) said abutment being adapted to engage the loops which define said one slot and thereby halt further movement of said animal away from said area, (*m*) said loops freely releasing said tether and said abutment as said animal moves back into said area, (*n*) said bars being adapted to be set with the lower faces thereof close enough to the surface of the ground to keep said animal from crawling between said bars and said surface of said ground.

5. A restraining device for animals which comprises:

(*a*) a plurality of posts that are adapted to have the lower portions thereof set in the ground and to have the upper portions thereof disposed above the surface of the ground, (*b*) elongated bars that are adapted to be secured to said posts, (*c*) fasteners that secure said bars to said posts to enable said posts to support said bars, (*d*) slot-defining members on said bars that define slots which extend inwardly of said bars, (*e*) a tether that can be secured to the collar of an animal, (*f*) said tether being dimensioned to fit loosely within said slots, and (*g*) an abutment that is secured to said tether and that is dimensioned so it can not pass through said slots, (*h*) said posts and said bars being adapted to coact to define a closed area, (*i*) said tether and said abutment being adapted to trail along freely as said animal moves about within said area, (*j*) said abutment being adapted to engage said slot-forming members as said animal attempts to move away from said area and thereby halt further movement of said animal away from said area, (*k*) said slot-forming members freely releasing said tether and said abutment as said animal moves back into said area, (*l*) said bars being adapted to be set with their lower faces close enough to the surface of the ground to keep said animal from crawling between said bars and said surface of said ground.

6. A restraining device for animals which comprises:

(*a*) a plurality of posts that are adapted to have the lower portions thereof set in the ground and to have the upper portions thereof disposed above the surface of the ground, (*b*) elongated bars that are adapted to be secured to said posts, (*c*) fasteners that secure said bars to said posts to enable said posts to support said bars, (*d*) means on said bars that define slots which extend transversely of said bars, (*e*) a tether that can be secured to the collar of an animal, (*f*) said tether being dimensioned to fit loosely within said slots, and (*g*) an abutment that is secured to said tether and that is dimensioned so it can not pass through said slots, (*h*) said posts and said bars being adapted to coact to define a closed area, (*i*) said tether and said abutment being adapted to trail along freely as said animal moves about within said area, (*j*) said abutment being adapted to engage said means as said animal attempts to move away from said area and thereby halt further movement of said animal away from said area, (*k*) said means freely releasing said tether and said abutment as said animal moves back into said area.

7. A restraining device for animals which comprises:

(*a*) a plurality of elongated bars that are adapted to define an area adjacent to and within which an animal can be confined, (*b*) means on said bars that define slots which extend transversely of said bars, (*c*) a tether that can be secured to the collar of an animal, (*d*) said tether being dimensioned to fit loosely within said slots, and (*e*) an abutment that is secured to said tether and that is dimensioned so it can not pass through said slots, (*f*) said tether and said abutment being adapted to trail along freely as said animal moves about within said area, (*g*) said abutment being adapted to engage said means as said animal attempts to move away from said area and thereby halt further movement of said animal away from said area.

8. A restraining device for animals which comprises:

(*a*) a plurality of elongated bars that are adapted to define an area adjacent to and within which an animan can be confined, (*b*) means on said bars that define slots which extend transversely of said bars, (*c*) a tether that can be secured to the collar of an animal, (*d*) said tether being dimensioned to fit loosely within said slots, and (*e*) an abutment that is secured to said tether and that is dimensioned so it can not pass through said slots, (*f*) said tether and said abutment being adapted to trail along freely as said animal moves about within said area, (*g*) said abutment being adapted to engage said means as said animal attempts to move away from said area and thereby halt further movement of said animal away from said area, (*h*) said bars being selectively removable to permit mowing, rolling or aerating of said area.

9. A restraining device for animals which comprises:

(*a*) a plurality of posts that are adapted to have the lower portions thereof set in the ground and to have the upper portions thereof disposed above the surface of the ground, (*b*) brackets that are supported by said posts, (*c*) elongated bars that are securable to said brackets and hence to said posts, (*d*) fasteners that secure said bars to said brackets, and thus to said posts, to enable said posts to support said bars, (*e*) means on said bars that define slots which extend transversely of said bars, (*f*) a tether that can be secured to the collar of an animal, (*g*) said tether being dimensioned to fit loosely within said slots, and (*h*) an abutment that is secured to said tether and that is dimensioned so it can not pass through said slots, (*i*) said posts and said bars being adapted to coact to define a closed area, (*j*) said tether and said abutment being adapted to trail along freely as said animal moves about within said area, (*k*) said abutment being adapted to engage said means as said animal attempts to move away from said area and thereby halt further movement of said animal away from said area, (*l*) said means freely releasing said tether and said abutment as said animal moves back into said area, (*m*) said brackets enabling said bars to be set so the elongated axes of said bars are inclined relative to the faces of said posts.

10. A restraining device for animals which comprises:

(*a*) a plurality of posts that are adapted to have the lower portions thereof set in the ground and to have the upper portions thereof disposed above the surface of the ground, (b) brackets that are supported by said posts, (c) elongated bars that are securable to said brackets and hence to said posts, (d) fasteners that secure said bars to said brackets, and thus to said posts, to enable said posts to support said bars, (e) means on said bars that define slots which extend transversely of said bars, (f) a tether that can be secured to the collar of an animal, (g) said tether being dimensioned to fit loosely within said slots, and (h) an abutment that is secured to said tether and that is dimensioned so it can not pass through said slots, (i) said posts and said bars being adapted to coact to define a closed area, (j) said tether and said abutment being adapted to trail along freely as said animal moves about within said area, (k) said abutment being adapted to engage said means as said animal attempts to move away from said area and thereby halt further movement of said animal away from said area, (l) said means freely releasing said tether and said abutment as said animal moves back into said area, (m) some of said posts being corner posts, (n) other of said posts being line posts.

References Cited by the Examiner

UNITED STATES PATENTS

| | | | |
|---|---|---|---|
| 207,963 | 9/78 | Hallner et al. | 119—107 |
| 283,240 | 8/83 | Heaton | 119—107 |

SAMUEL KOREN, *Primary Examiner.*

HUGH R. CHAMBLEE, *Examiner.*